No. 661,552. Patented Nov. 13, 1900.
T. E. & L. E. RICH.
SANDPAPERING MACHINE.
(Application filed Feb. 1, 1900.)

(No Model.) 3 Sheets—Sheet 1.

No. 661,552. Patented Nov. 13, 1900.
T. E. & L. E. RICH.
SANDPAPERING MACHINE.
(Application filed Feb. 1, 1900.)

(No Model.) 3 Sheets—Sheet 3.

Witnesses:
Harry M. Rugg.
Ava T. Murphy.

Inventors.
Thomas E. Rich
Lewis E. Rich
By Rufus B. Fowler Atty.

THE NORRIS PETERS CO., PHOTO-LITHO., WASHINGTON, D. C.

UNITED STATES PATENT OFFICE.

THOMAS E. RICH AND LEWIS E. RICH, OF BARRE, MASSACHUSETTS.

SANDPAPERING-MACHINE.

SPECIFICATION forming part of Letters Patent No. 661,552, dated November 13, 1900.

Application filed February 1, 1900. Serial No. 3,577. (No model.)

*To all whom it may concern:*

Be it known that we, THOMAS E. RICH and LEWIS E. RICH, citizens of the United States, and residents of Barre, in the county of Worcester and Commonwealth of Massachusetts, have invented a new and useful Improvement in Sandpapering-Machines, of which the following is a specification, reference being had to the accompanying drawings, forming a part of the same, in which—

Figure 1:
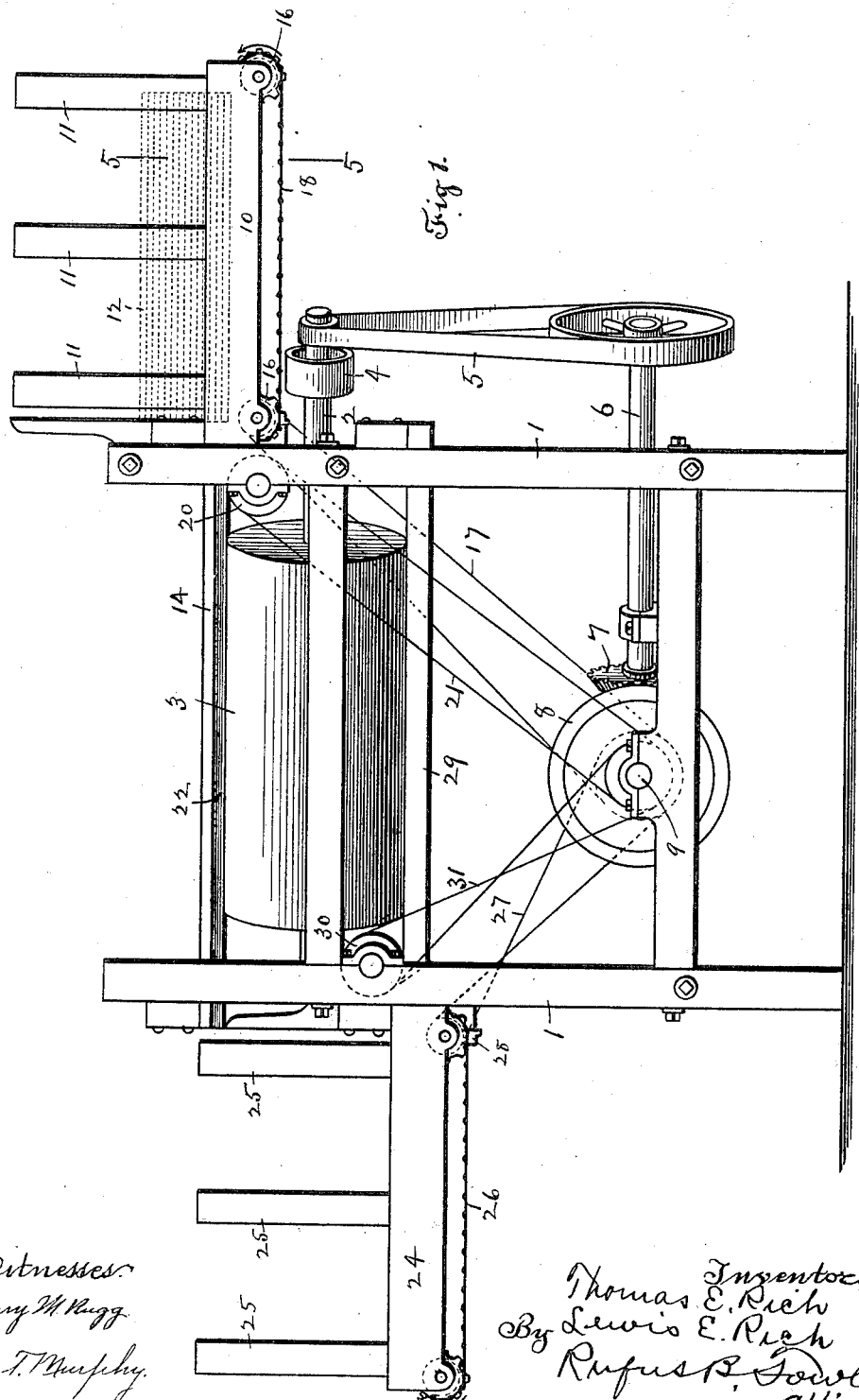
Figure 2:
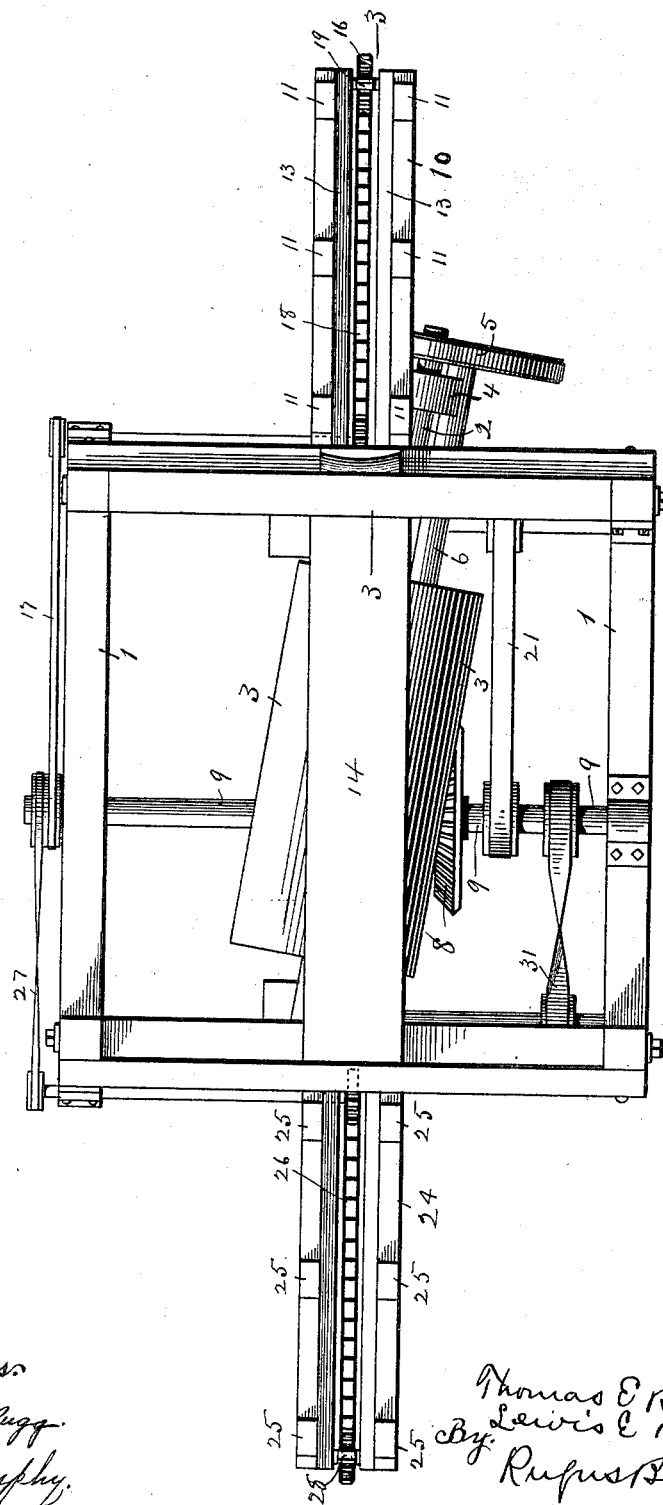
Figure 3:
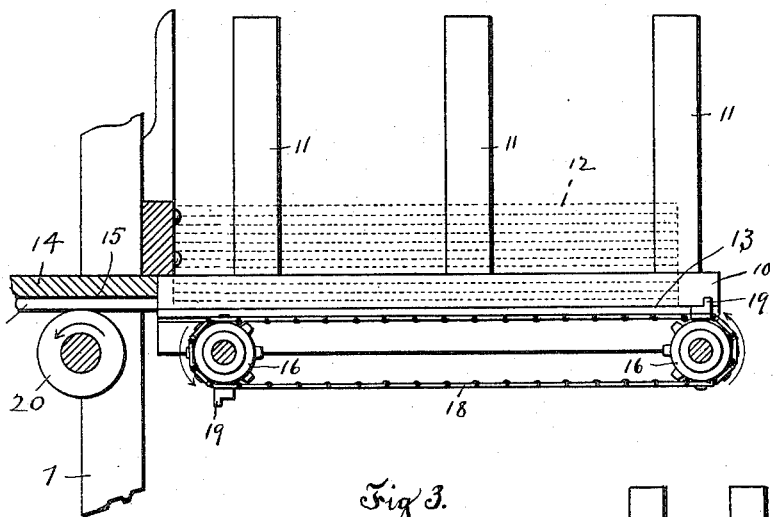
Figure 6:
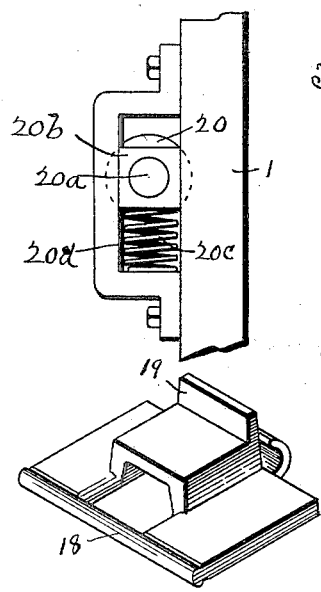
Figure 4:
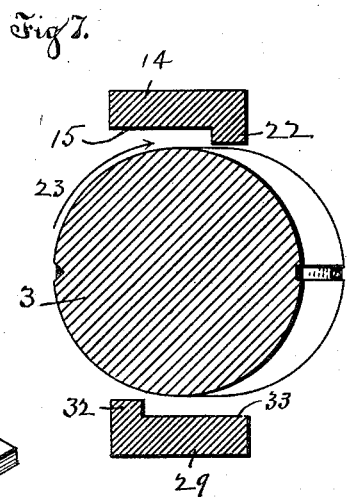
Figure 5:
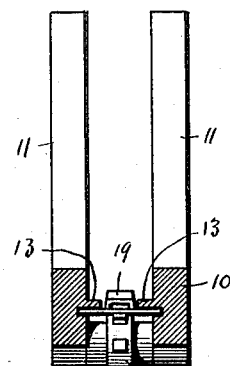

Figure 1 represents a side elevation of a sandpapering-machine embodying our invention. Fig. 2 is a top view of the same. Fig. 3 is a side elevation of one of the stacks for holding the articles to be sandpapered, shown in sectional view on line 3 3, Fig. 2. Fig. 4 is a transverse sectional view of the sandpapering-roll and the upper and lower guideways for conducting the articles to be sandpapered across the roll. Fig. 5 represents a portion of the stack for holding the articles to be sandpapered, the section being taken on line 5 5, Fig. 1. Fig. 6 is a perspective view of one of the links of an endless chain provided with a lip by which the articles to be smoothed are fed forward into the machine, and Fig. 7 represents a yielding box of one of the feed-roll shafts.

Similar reference-figures refer to similar parts in the different views.

Our invention consists in certain improvements in sandpapering-machines, particularly those designed for sandpapering narrow strips of wood, such as blind-slats and similar articles, as hereinafter described, and pointed out in the annexed claims.

Referring to the drawings, 1 denotes the framework, 2 a shaft journaled therein and carrying an abrading-roll 3, preferably covered with sandpaper and driven by a pulley 4 through a belt connection with a driving-shaft chain. (Not shown.) Power is imparted from the shaft 2, through the belt 5, to a shaft 6, carrying a bevel-pinion 7, which engages a bevel-gear 8 on a shaft 9, carrying a series of pulleys by which the feeding mechanisms are operated.

The blind-slats or other articles to be sandpapered are placed in a stack 10, between the upright posts 11, their position being indicated by the broken lines 12 12, with the lowermost slat in the stack resting upon the inwardly-projecting slats 13 13, Figs. 3 and 5. Extending across the machine is a guide 14, with its under surface 15 raised above the lips 13 sufficiently to allow the lowermost slat in the stack to be fed forward beneath the guide 14. Journaled in bearings below the stack 10 are a pair of sprocket-wheels 16, driven by a belt 17 from the lower driving-shaft 9 and carrying a feed-chain 18, having two of its links provided with lips 19, which as they pass above the sprocket-wheels 16 project upwardly between the lips 13, so as to engage the end of the lowermost slat in the stack and push it forward under the guide 14 and between the surface 15 of the guide and a revolving feed-roll 20, which is driven by a belt 21 from the shaft 9. The feed-roll 20 is carried upon a shaft $20^a$, which is journaled at one end in a box $20^b$, resting upon a spring $20^c$ and capable of a vertical movement in ways $20^d$, so the roll will accommodate itself to slats of different thicknesses. The abrading-roll 3 revolves beneath the guide 14 and at a suitable distance from the surface 15, so the under side of the blind-slat will be held against the guide by its contact with the abrading-roll 3. One edge of the guide 14 is provided with a rib 22, and the abrading-roll 3, revolving in the direction of the arrow 23, Fig. 4, serves to hold the edge of the blind-slat not only against the surface 15 of the guide, but also against the rib 22. The blind-slat is fed forward between the guide 14 and the abrading-roll 3 by the rotation of the feed-roll 20, and its movement is continued after it passes the feed-roll 20 by the contact of the next succeeding blind-slat which is brought forward by the feed-chain 18. A line of slats are therefore kept passing across the machine beneath the guide and in contact with the abrading-roll 3, causing one side of the blind-slat to be smoothed. As the slats are delivered from the guides 14 they fall into a second stack 24 at the opposite side of the machine and upon a lower plane, ready to be returned beneath and in contact with the abrading-roll. The stack 24 is a duplicate of the stack 10, having supporting-lips $24^a$ and uprights 25, between which the blind-slats are held, and it is provided with a duplicate feeding mechanism comprising a feed-chain 26, driven by a belt 27 from the shaft 9, and having links provided with lips 28 similar to the feed-chain 18, arranged to engage the lowermost slat in the stack 24 and push it forward between a guide 29 and a feed-roll 30, driven by a belt 31 from the shaft 9. The feed-roll 30 is a duplicate of the feed-roll 20 and is capable of a vertical yielding motion. The guide 29 is provided with a lip 32, against which the edge of the blind-slat is held by the contact of the rotating abrading-roll 3, and one side of the slat is pressed against the surface 33 of the guide during the operation of smoothing its opposite side.

By the action of the feed mechanism, comprising the endless chain 26, a line of slats are fed from the lower stack 24 beneath the abrading-roll and delivered from the end of the lower guide 29 into a receptacle or upon the floor beneath the stack 10. The two guides 14 and 29 are parallel with each other, one being placed above and the other below the abrading-roll 3, and the axis of the abrading-roll 3 is placed obliquely to the line of motion of the blind-slats as they are conducted by the guides 14 and 29, so that the abrading-surface of the roll 3 in contact with the blind-slat passes diagonally across the surface of the slat. The obliquity of the axis of the roll 3 to the line of motion of the blind-slats is just enough to bring the periphery of the roll tangential to the under surface of the blind-slat at one edge of the slat at one end of the roll 3 and tangential to the surface of the slat at the opposite edge of the slat at the other end of the roll, so that the side of the slat in contact with the roll will be smoothed in a true plane. The guides 14 and 29 are left open on the sides opposite the ribs 22 and 32, so that in case it is necessary to remove the slats between the roll 3 and the guides the roll can be stopped and the slats removed, or by reversing the motion of the roll the slats will be thrown out of the guides.

Our improved machine requires but one attendant to fill the stack 10 and to remove the blind-slats from the machine, as the finished slats are delivered at the same point at which they are fed to the machine and both sides of the slats are smoothed by the action of the same roll. The abrading-surface is largely increased by the employment of a roll and feeding the slats from end to end of the roll, and the amount of abrading-surface can be increased by increasing the length of the abrading-roll. Both sides of the slats are simultaneously smoothed, and they are readily removed from the guides when necessary.

What we claim as our invention, and desire to secure by Letters Patent, is—

1. In a sandpapering-machine, the combination with a guideway and an abrading-roll with its axis placed obliquely to said guideway, of means for holding the work in said guideway from lateral movement with one edge of the work tangential to said roll at one end and the opposite edge of the work tangential to the roll at its opposite end, substantially as described.

2. The combination with a revolving abrading-roll, of guides for the articles to be smoothed placed obliquely to the axis of said roll, one of said guides being placed above and the other below said roll, a lip at one edge of the upper guide and a lip at the opposite edge of the lower guide, said lips being arranged to hold the work against lateral movement by the action of said revolving roll, substantially as described.

3. In a sandpapering-machine, the combination with a revolving abrading-roll, of a guide for the articles to be smoothed, said guide having a supporting-surface by which the article to be smoothed is held in contact with the surface of the abrading-roll and having a lip at one edge of said supporting-surface toward which the abrading-roll revolves, substantially as described.

4. The combination of a revolving abrading-roll, a guide parallel with the face of the roll and at an oblique angle to its axis, a stack in alinement with said guide and mechanism for feeding articles from said stack into said guide, substantially as described.

5. The combination of a revolving abrading-surface, a guide by which the articles to be smoothed are conducted across said abrading-surface, a yielding feed-roll by which the articles to be smoothed are fed to said guide, a vertical stack and an endless chain adapted to engage and push the articles from said stack forward to said feed-roll, substantially as described.

6. The combination in a sandpapering-machine of a revolving abrading-roll, a guide parallel with the face of said roll, means for feeding the articles to be smoothed along said guide, a second guide parallel with the face of the roll and on the opposite side of said roll and means for feeding the articles to be smoothed along said second guide, substantially as described.

7. The combination with a revolving abrading-roll, of guides for the articles to be smoothed, one of said guides being above and the other below said abrading-roll, means for feeding the articles to be smoothed along said upper guide, a stack, or receptacle, arranged to receive the articles from said upper guide and present them to the lower guide and means for feeding the articles along said lower guide, substantially as described.

8. The combination in a sandpapering-machine of a revolving abrading-roll, of a pair of guides parallel with the face of said roll and at an oblique angle with its axis, said guides being on opposite sides of said abrading-roll, whereby the articles to be smoothed are conducted across the surface of said abrading-roll on opposite sides and in opposite directions, substantially as described.

9. The combination of a revolving abrading-roll, of a guide placed at an oblique angle with the axis of the roll, a vertical stack, an endless chain carrying lips adapted to engage the articles held in said stack and push them between said guide and a feed-roll and a yielding feed-roll by which the articles are fed along said guide, substantially as described.

10. In a sandpapering-machine, the combination with a revolving abrading-surface, of means for feeding the articles to be smoothed across said abrading-surface, a stack, or receptacle, into which the articles, when smoothed on one side, fall by gravity and are held in alinement with the revolving abrading-surface by which the opposite side is smoothed, substantially as described.

11. The combination with a frame, of a shaft 2 journaled in said frame, an abrading-roll carried in said shaft, guides 14 and 29 parallel with each other and at an oblique angle with the axis of said abrading-roll and lips 22 and 32 on the sides of said guides arranged to resist the sidewise movement of the article to be smoothed while in contact with the abrading-wheel, substantially as described.

In testimony whereof we have signed our names to this specification, in presence of two subscribing witnesses, this 29th day of January, 1900.

THOMAS E. RICH.
LEWIS E. RICH.

Witnesses:
CHARLES F. ATWOOD,
FRANKLIN J. CLARK.